(12) United States Patent
Saitou (10) Patent No.: US 6,510,580 B1
(45) Date of Patent: Jan. 28, 2003

(54) WIPER DEVICE WITH PIN MOUNTING

(75) Inventor: Kenichi Saitou, Kosai (JP)

(73) Assignee: Asmo Co., Ltd., Kosai (JP)

( * ) Notice: Subject to any disclaimer, the term of this patent is extended or adjusted under 35 U.S.C. 154(b) by 0 days.

(21) Appl. No.: 09/374,224

(22) Filed: Aug. 13, 1999

(30) Foreign Application Priority Data

Aug. 27, 1998 (JP) ........................................... 10-241500
May 24, 1999 (JP) ........................................... 11-143309

(51) Int. Cl.$^7$ ................................................. B60S 1/06
(52) U.S. Cl. ........................ 15/250.31; 15/250.3; 74/43; 296/96.17
(58) Field of Search ........................ 15/250.3, 250.31, 15/250.27, 250.14; 74/42, 43; 296/96.17, 96.15

(56) References Cited

U.S. PATENT DOCUMENTS

| 5,074,613 A | * | 12/1991 | Unterborn et al. | ........ 15/250.31 |
| 5,222,706 A | * | 6/1993 | Hoshino | ................... 15/250.31 |
| 5,873,280 A | | 2/1999 | Kanazawa | ..................... 74/42 |
| 5,878,631 A | * | 3/1999 | Muehlpforte et al. | .... 15/250.31 |
| 5,960,512 A | * | 10/1999 | Schael et al. | ............ 15/250.31 |
| 6,168,223 B1 | * | 1/2001 | Egner-Walter et al. | .. 296/96.17 |
| 6,173,597 B1 | * | 1/2001 | Muehlpforte et al. | ...... 15/250.3 |
| 6,209,373 B1 | * | 4/2001 | Muehlpforte et al. | ...... 15/250.3 |

FOREIGN PATENT DOCUMENTS

| DE | 4036367 | * | 5/1992 | ................. 15/250.3 |
| EP | 359733 | * | 3/1990 | ................. 15/250.3 |
| FR | 2667833 | * | 4/1992 | ............... 15/250.27 |
| GB | 2228188 | * | 8/1990 | ............... 15/250.27 |

* cited by examiner

Primary Examiner—Gary K. Graham
(74) Attorney, Agent, or Firm—Fish & Richardson, PC (57) ABSTRACT

In a wiper device, a wiper motor and link module is integrated in advance into an assembly composed of a pair of pivot shafts, a pair of pivot holders, a frame, a wiper motor and a link mechanism. When the module is fixed to a vehicle body, a supporting pin provided at the wiper motor is at first inserted into and held by a hole of the vehicle body to decide a fixing position of the module as a reference position and, then, a pair of fastening portions of the pivot holders are fixed to the vehicle body by bolts.

14 Claims, 5 Drawing Sheets

WIPER DEVICE WITH PIN MOUNTING

CROSS REFERENCE TO RELATED APPLICATION

This application is based upon and claims the benefit of priority of Japanese Patent Applications No. H.10-241500 filed on Aug. 7, 1998 and No. H.11-143309 filed on May 24, 1999, the contents of which are incorporated herein by reference.

BACKGROUND OF THE INVENTION

1. Field of the Invention

The present invention relates to a wiper device having a wiper motor and link module to be easily and accurately fixed to a vehicle body.

2. Description of Related Art

In a conventional wiper device for wiping a wind shield glass of a vehicle, rain drops are wiped off the wind shield glass by a given range reciprocating movement of a wiper arm attached to a pivot shaft according to the movement of the 20 pivot shaft. A wiper bracket constituting a pivot holder rotatably supports the pivot shaft. The wiper bracket is fixed by a fastening bolt to the vehicle body (for example, a cowl panel arranged beneath the wind shield glass).

In particular, JP-A-9-175336 discloses a wiper device having a wiper motor and link module in which, in a vehicle having a pair of wiper arms and blades, a pair of the wiper brackets for supporting each of pivot shafts are fixed respectively to both width sides of the vehicle body and integrated with a frame for supporting a wiper motor and so on. In the wiper device, another bracket is fixed by welding to the frame connecting the pivot holders (wiper brackets) and the wiper motor is fixed on the bracket.

The wiper device having the wiper motor and link module according to the construction mentioned above is relatively simple and compact. The wiper device is generally fixed to the vehicle body by at least three fastening bolts to be inserted respectively into three installation holes, two for the pair of pivot holders and one for the bracket.

In case of fastening and fixing the wiper device to the vehicle body at three points such as two for the pivot holders and one for the bracket, the fixing positions are forced to be determined exactly at the three points and, if there exists a discrepancy due to fabrication errors between the installation positions of the wiper device (pivot holders and so on) and those of the vehicle body, an adjustment of the three points becomes necessary. For this purpose, one or more of the installation holes (for example, two installation holes) of the wiper device are provided with long narrow shaped cross sectional holes or larger so called loose holes which make a slight adjustment available.

However, in such a case, the adjusting work for fixing accurately the wiper device to the vehicle body is so complicated that the installation work productivity may be inadvertently affected. Further, the fastening work needs more time and more number of fastening parts are required because the wiper device is fixed to the vehicle body in a manner that the three fasteners such as bolts are inserted into and fastened to the three installation holes, respectively.

SUMMARY OF THE INVENTION

The present invention has been made in view of the above mentioned problem, and an object of the present invention is to provide a wiper device which may be fixed accurately to given positions of the vehicle body with an easy slight adjustment of the installation position, resulting in shorter time for fastening work and smaller number of fastening parts.

To achieve the above object, the wiper device has a motor and link module to be fixed to a vehicle body. The motor and link module are composed of a frame, a wiper motor for generating a driving force fixed to the frame and provided with a supporting pin to be inserted into and held by a hole of the vehicle body, a pair of pivot shafts, a pair of pivot holders, each of which has a fastening portion to be fastened and fixed to the vehicle body, for rotatably supporting each of the pivot shafts respectively fixed at both ends of the frame and a link mechanism connecting the motor and each of the pivot shafts for transmitting the driving force of the motor to each of the pivot shafts, wherein a gravity force at a gravity center of the motor is exerted to cross a territorial region surrounded by positions of the supporting pin and the respective fastening portions of the pivot holders.

According to the wiper device mentioned above, the wiper motor and link module that the pivot shafts, the pivot holders, the frame, the motor and the link mechanism are integrated in advance into an assembly is fixed to the vehicle body. The supporting pin of the wiper motor is at first inserted into and held by the hole of the vehicle body to decide a fixing position of the module as a reference position and, then, the fastening portions of the pivot holders are fixed to the vehicle body.

The reference position for fixing the module to the vehicle body is decided only by inserting the supporting pin into the hole and the module is held at the position by the pin and the hole. This makes the fixing of the module to the vehicle body very easy.

Further, if there is a discrepancy between the installation positions of the module and those of the vehicle body, the supporting pin may be slightly moved back in an inserting direction to the hole without shifting the reference position thereof for an adjustment purpose when the fastening portions of the pivot holders are fastened and fixed to the vehicle body. Therefore, the fixing work including the slight adjustment of the fixing positions may be easily conducted in shorter time.

Furthermore, as a gravity force at a gravity center of the motor crosses a territorial region surrounded by positions where the supporting pin and the respective fastening portions of the pivot holders are located, a heavy weight of the motor and the like may be adequately shared with the holding and fixing points so that a force against the supporting pin may become smaller and the possible break down of the supporting pin may be effectively prevented.

The wiper motor is provided with a fixing base at a side thereof where the motor is fixed to the frame and with the supporting pin at a side opposite to the fixing base so that the relatively heavy motor may be supported with an adequate weight balance by the frame and the supporting pin.

Further, as the supporting pin is protruded from the wiper motor in a direction far from a line connecting the respective fastening portions of the pivot holders, the wiper motor is effectively installed on the module so that the gravity force at a gravity center of the motor may cross a region surrounded by positions where the supporting pin and the fastening portions of the pivot holders are located.

Though the relatively heavy wiper motor is arranged at one side of a straight line connecting the respective fastening portions of the pivot holders, a moment operative around the straight line may be eased by allocating the weight of the wiper motor to the supporting pin located far away from the straight line so as to constitute a triangle by the supporting pin and the two fastening portions of the pivot holders.

The supporting pin is provided with a stopper so that the supporting pin may be simply inserted into the hole of the vehicle body until the insertion of the pin is restricted. Once the module is inserted into the hole, the position of the module to the vehicle body is held as the reference position. As a result, an easy and accurate fixing operation can be secured without skill.

The supporting pin is inserted through a bush into the hole of the vehicle body. The bush is made of elastic material such as rubber and has a cylindrical portion and a flange portion provided at an end of the cylindrical portion. An outer circumference surface of the cylindrical portion is fitted into the hole. The supporting pin is inserted through an inner circumference of the cylindrical portion and the flange portion is in contact with a periphery around the hole. Therefore, the bush absorbs the vibration occurred when the motor is driven so that the transmission of the vibration through the supporting pin and the hole to the vehicle body may be prevented. Further, the bush prevents vibration noises that may be generated, if the supporting pin were directly in contact with the periphery of the hole.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

A preferred embodiment of the present invention is described hereinafter according to FIGS. 1 to 3.

A wiper device 10 has a pair of pivot holders 12 and 14. A basic structure of the pivot holder 14 is same as that of the pivot holder 12. The pivot holder 12 locates at a side of a driver seat and the pivot holder 14 at a side of a passenger seat. The pivot holders 12 and 14 are respectively provided with cylindrical portions 16 and 18 into which pivot shafts 20 and 22 are inserted and which rotatably support the pivot shafts 20 and 22, respectively. Each of pivot levers 24 and 26 is fixed to a leading end of the respective pivot shafts 20 and 22 so that the pivot shafts 20 and 26 may rotate according to the swinging movement of the pivot levers 24 and 26.

Each of installation holes 28 and 30 is formed at a corner of the respective pivot holders 12 and 14. The wiper device 10 is fixed to a vehicle body by fastening bolts (not shown) inserted into the respective installation holes 28 and 30. The installation hole 28 of the pivot holder 12 at the driver seat side is formed as a long narrow circular cross sectional hole so that the pivot holder 12 may slide in one direction with respect to the fastening bolt before being fixed to the vehicle body. On the other hand, the installation hole 30 of the pivot holder 14 at the passenger seat side is formed as a hole whose diameter is larger than that of the fastening bolt, so called a loose hole, so that the pivot holder 14 may move in all directions with respect to the fastening bolt.

Each of pivot holders 12 and 14 is provided with each of connecting shafts 32 and 34 at the side wall portion thereof at a side opposite to the installation hole. Each of the connecting shafts 32 and 34 is a circular cross sectional pure shaft and has at the leading end thereof each of connecting portions 36 and 38 to be fitted into a hollow frame 42 which will be described later. Each of the connecting shafts 32 and 34 may be not only the circular cross sectional pure shaft but also a ring shaped cross sectional hollow shaft.

Figures 3, 8:
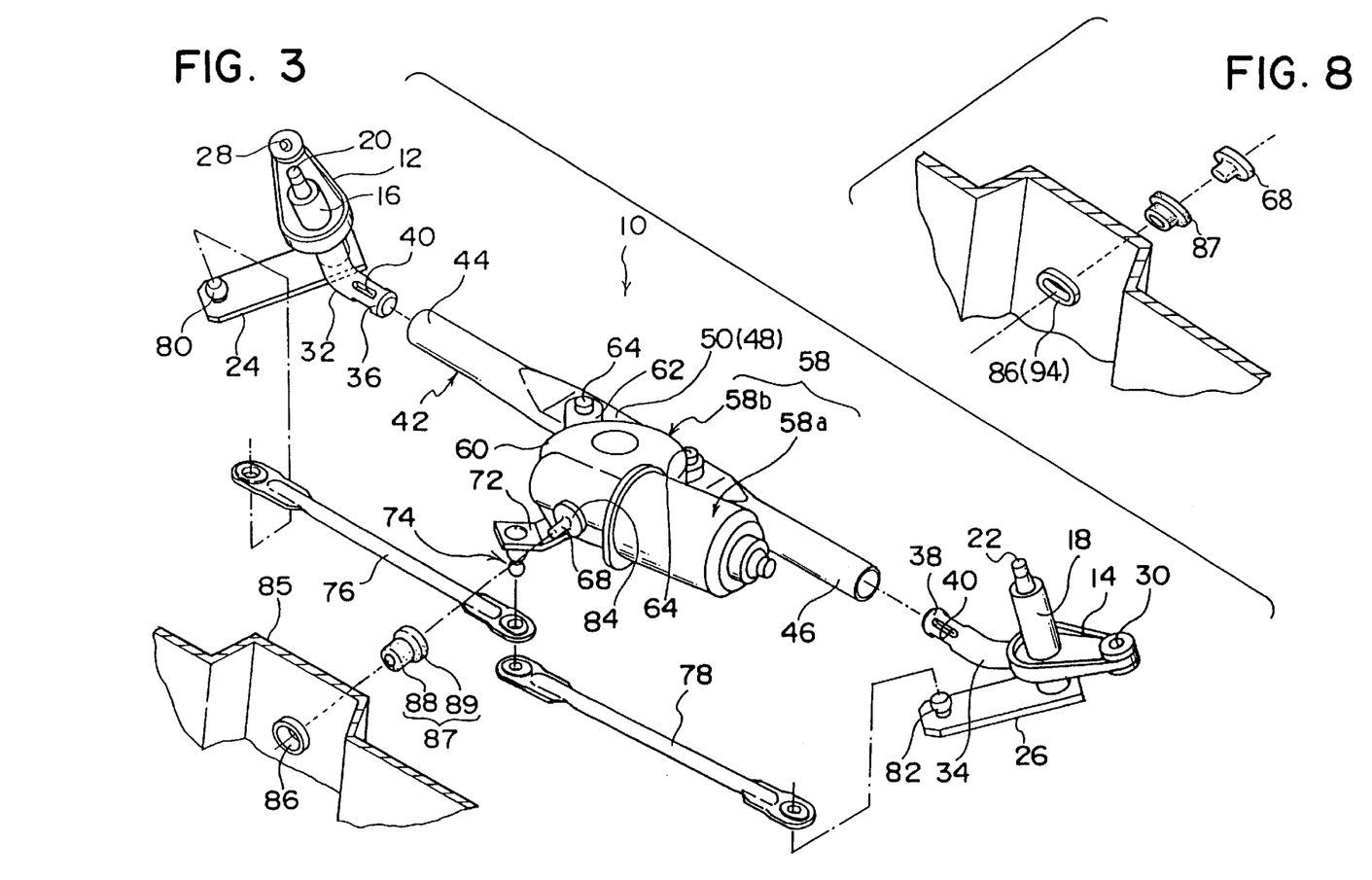
FIG. 3 is a slant view showing a structure of main portions taken apart to pieces of the wiper device.
FIG. 8 is a slant view showing a modified structure of a supporting pin, a bush and a holding hole.

The connecting portions 36 and 38 are respectively provided with concave 40, as shown in FIG. 3. The hollow frame 42 has at both longitudinal ends connecting portions 44 and 46 corresponding respectively to the connecting portions 36 and 38 of the connecting shafts 32 and 34. Each of the connecting portions 44 and 46 has a ring shaped cross section and is fitted with and fixed to each of the connecting portions 36 and 38 by caulking at the places of the concave 40.

Figure 5:
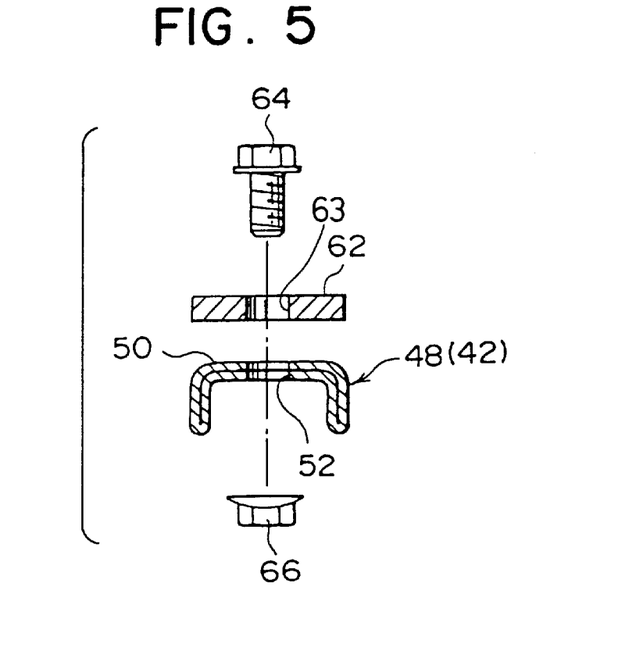
FIG. 5 is a cross sectional view showing a structure for installation to a hollow frame.
Figure 6A:
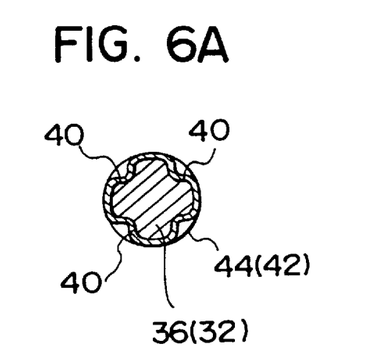
FIG. 6A is a cross sectional view taken along a line VIA—VIA of FIG. 2.
Figure 6B:
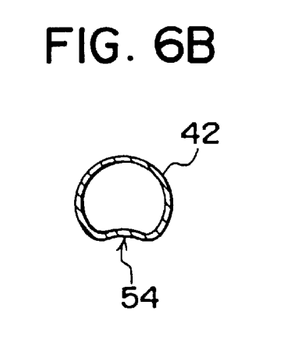
FIG. 6B is a cross sectional view taken along a line VB—VB of FIG. 2.
Figure 6C:
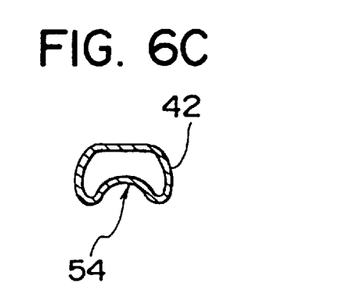
FIG. 6C is a cross sectional view taken along a line VIC—VIC of FIG. 2.
Figure 6D:
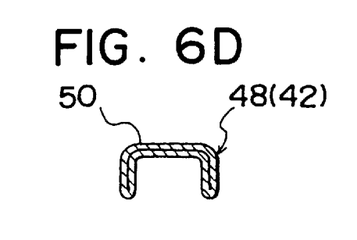
FIG. 6D is a cross sectional view taken along a line VID—VID of FIG. 2.

The hollow frame 42 has an installation base 48 at a longitudinal intermediate portion. The installation base 48 has a one side open square shaped cross section without hollowness and the upper surface of the installation base 48 constitutes a flat installation seat 50, as shown in FIG. 5. Further, the installation base 48 is provided with a pair of installation holes 52 for fixing a driving source that will be described later. Each of the installation holes penetrates both sides of the installation base 48 (the flat installation seat 50).

The hollow frame 42 is provided with transient portions 54 and 56 at both longitudinal sides of the installation base 48. FIGS. 6A to 6D show a change of the cross section of the respective transient portions 54 and 56. The hollow cross section of the transient portions 54 and 56 gradually changes from the one side open square shape without hollowness at the installation base 48 to the ring shape toward the respective connecting portions 44 and 46.

Pressing a circular cross sectional hollow member such as a pipe forms the hollow frame 42 constituting the installation base 48 and the transient portions 54 and 56. The transient portions 54 and 56 are formed simultaneously with the pressing operation for forming the installation base 48. Further, the same pressing process as that for forming the installation base 48 forms the two installation holes 52.

A wiper motor 58 as the driving source is mounted on the flat installation seat 50 at the installation base 48 of the hollow frame 42. The wiper motor 58 is composed of a motor portion 58*a* and a gear portion 58*b* integrated with the motor portion 58*a*. A housing 60 of the gear portion 58*b* is provided with a pair of installation legs 62 protruding therefrom. The installation legs 62 have a pair of installation holes and are mounted on the flat installation seat 50 at the installation base 48 and fastened and fixed with the frame 42 by bolts 64 inserted into the installation holes 52 and 63 and nuts 66.

As described above, the wiper device 10 has a so called frame integration type structure that the pair pivot holders 12 and 14 are integrated with the hollow frame 42 for installing the wiper motor 58.

According to the wiper device 10 mentioned above, the housing 60 at the wiper motor 58 is provided with a supporting pin 68 protruding therefrom. The supporting pin 68 protrudes toward a front side of the housing 60 (a downside of the drawing in FIG. 1 and this side of the drawing in FIG. 2), that is, at a position far away and in a direction opposite to a line connecting the installation holes 28 and 30 where the pivot holders 12 and 14 are fixed to the vehicle body (opposite side from the installation legs 62 and the hollow frame). Further, the protruding direction of the supporting pin 68 is nearly perpendicular to an axial direction of an output shaft 70 of the wiper motor 58. The supporting pin 68 is inserted into a holding hole 86 provided in the vehicle body. A gravity force at the gravity center G of the wiper motor 58 is exerted to cross a territorial region X surrounded by the positions of the supporting pin 68 and the installation holes 28 and 30 where the pivot holders 12 and 14 are fixed to the vehicle body. The positions of the supporting pin 68 and installation holes 28 and 30 constitute a triangle.

Therefore, a relatively heavy weight of the wiper motor 58 may be adequately shared with the supporting pin 68 and the fastening bolts for the installation holes 28 and 30, while the wiper motor 58 may be supported with an adequate weight balance by the hollow frame 42 and the supporting pin 68. Though the wiper motor 58 is arranged at one side of a straight line connecting the respective installation holes 28 and 30, a moment operative around the straight line may be eased by allocating the weight of the wiper motor 58 to the supporting pin 68. On the other hand, a force against the supporting pin 68 is limited so that the possible break down of the supporting pin 68 may be effectively prevented.

The supporting pin 68 is provided with a shoulder, a stopper 84, at a secluded part thereof, to be in contact with a periphery of the holding hole 86 when the supporting pin 68 is inserted into the holding hole 86 of the vehicle body. A base portion of the shoulder of the supporting pin 68 (boundary 10 portion of the stopper 84)is provided with a smoothly curved corner rounded surface (so called R formation)all around the circumference thereof so that a break down of the base portion of the shoulder due to stress concentration may be effectively prevented.

Figure 1:
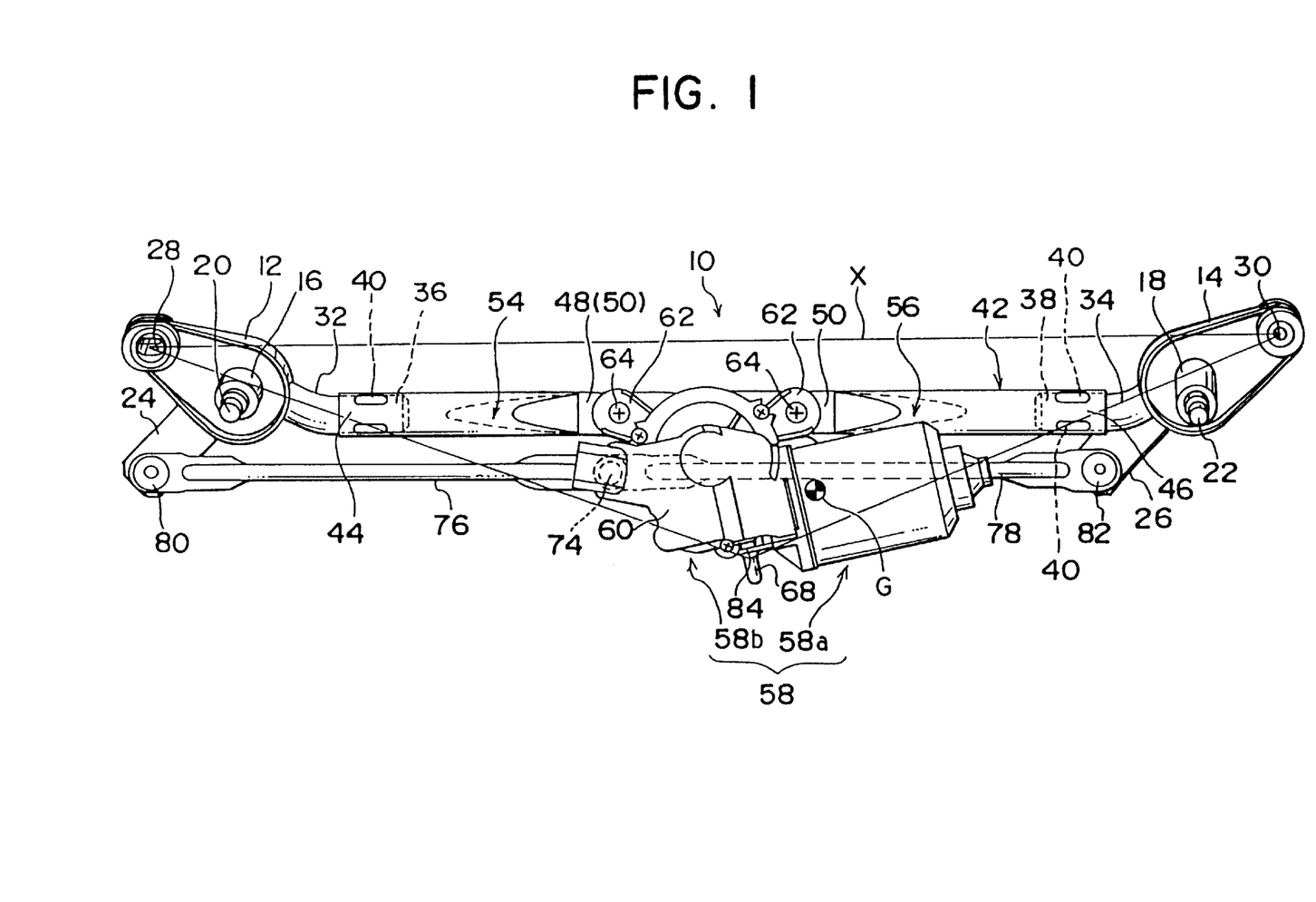
FIG. 1 is a plane view showing a whole structure of the wiper device according to the embodiment of the present invention.
Figure 2:
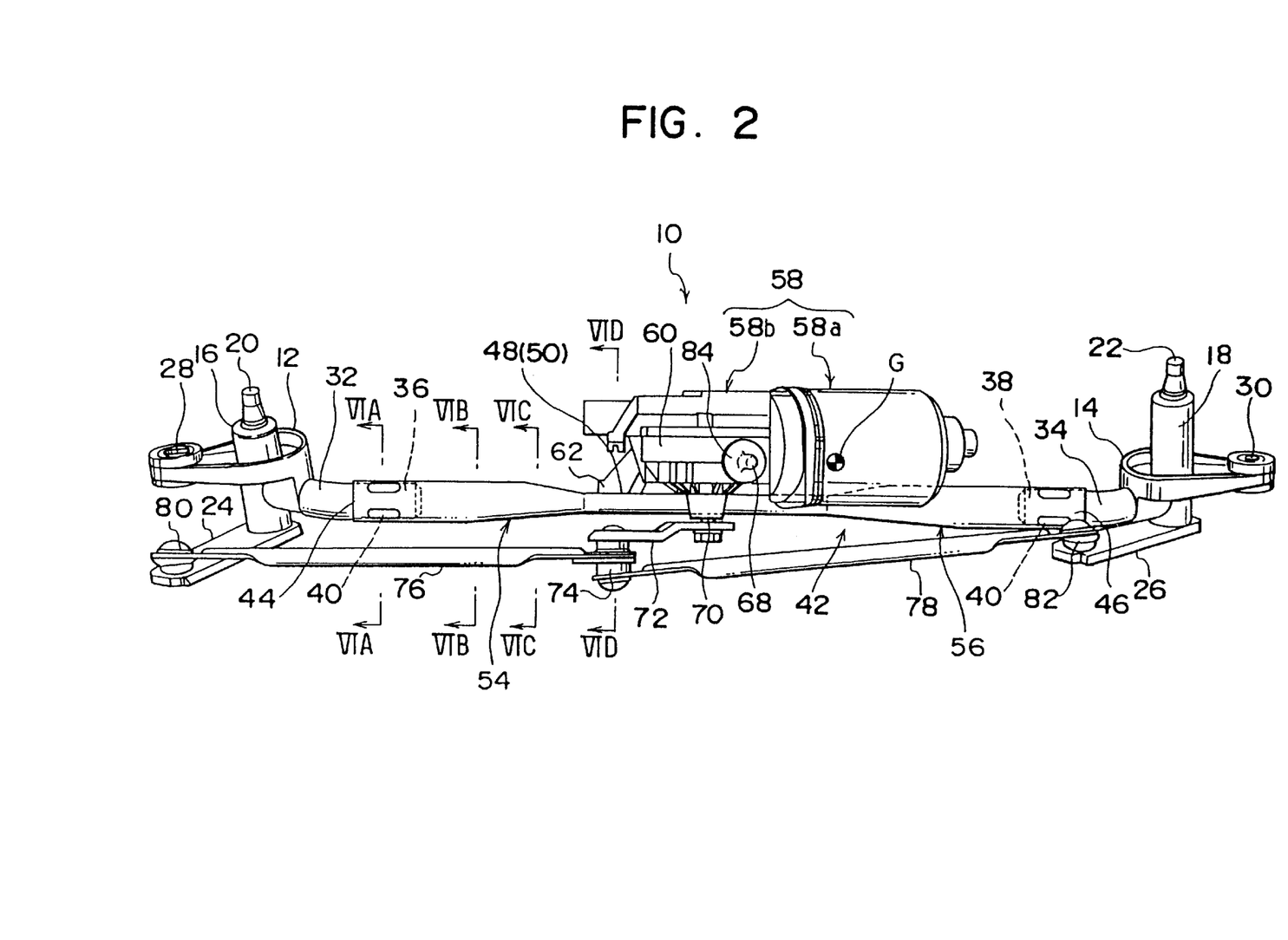
FIG. 2 is a front view showing the whole structure of the wiper device.

The output shaft 70 of the wiper motor 58 protrudes toward a rear side of the housing 60 (a backside of the drawing in FIG. 1 and a downside of the drawing in FIG. 2). A crank arm 72 is attached to a leading end of the output shaft 70. Link rods 76 and 78 are respectively connected to the crank arm 72 through a ball joint 74. The link rods 76 and 78 are connected to the pivot levers 24 and 26 through ball joints 80 and 82, respectively. When the wiper motor 58 is driven and the crank arm 72 is rotated, the pivot shafts 20 and 22 may be respectively rotated by driving forces transmitted through the respective link rods 76 and 78 and the respective pivot levers 24 and. 26.

Figure 4:
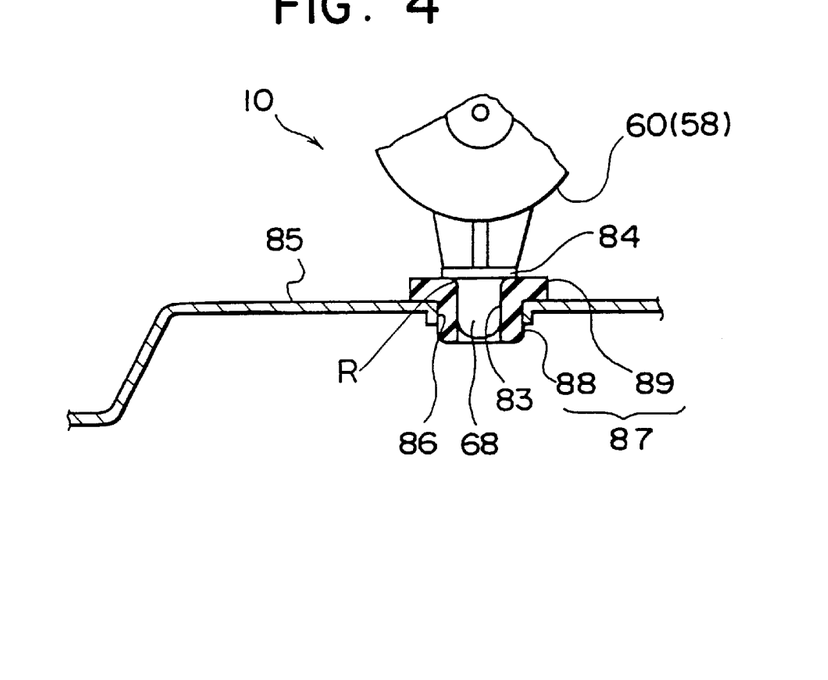
FIG. 4 is a partly cross sectional plane view showing a supporting pin inserted into a vehicle body.

As shown in FIG. 4, a panel 85 of the vehicle body is provided with the holding hole 86, into which the supporting pin 68 is inserted. The hole 86 decides a first reference position of the wiper device 10 when the wiper device 10 is held by and fixed to the vehicle body.

A bush 87 made of elastic material such as rubber is fitted into the holding hole 86. The bush 87 has a cylindrical portion 88 and a flange portion 89 provided at an end of the cylindrical portion 88. An outer circumference surface of the cylindrical portion 88 is fitted into the hole 86. One side of the flange 10 portion 89 is in contact with a periphery around the hole 86 and the other side thereof is in contact with the stopper 84 when the supporting pin 68 is inserted through an inner circumference of the cylindrical portion 88.

As the bush 87 absorbs the vibration occurred when the wiper motor 58 is driven, the transmission of the vibration through the supporting pin 68 and the hole 86 (the panel 85) to the vehicle body can be prevented. Further, the bush 87 prevents vibration noises that may be generated, if the supporting pin 68 were directly in contact with the panel 85 (the periphery of the hole 86).

The wiper device 10 is provided with wiper arms and blades (not shown) attached at a leading end of the respective pivot shafts 20 and 22. Each of the wiper arms and blades carries out a reciprocating movement within a given range according to the respective rotations of the pivot shafts 20 and 22.

According to the wiper device 10 mentioned above, the pivot shafts 20 and 22, the pivot holders 12 and 14, the hollow frame 42, the wiper motor 58, link rods 76 and 78 and the pivot levers 24 and 26 are integrated in advance into an assembly which constitutes a wiper motor and link module before the wiper device 10 is fixed to the vehicle body. After completing the assembly into the wiper motor and link module, the supporting pin 68 of the wiper motor 58 is inserted into the holding hole 86 (bush 87) provided at the panel 85 of the vehicle body and the position of the module to the vehicle body is held as a reference position. Then, the module is fastened and fixed to given positions of the vehicle body beneath the wind shield glass by bolts inserted into the installation holes 28 and 30.

After fixing the wiper and link module to the vehicle body, the wiper arms and blades are attached to the module for wiping rain drops off the wind shield glass according to the rotation 15 of the pivot shafts 20 and 22 to be driven by the wiper motor 58.

As the supporting pin 68 is provided with the stopper 84, the supporting pin 68 may be simply inserted into the hole 86 of the vehicle body until the insertion of the pin 68 is 20 restricted. Once the pin 68 is inserted into the hole 68, the position of the module to the vehicle body is held as a reference position. As a result, an easy and accurate fixing operation can be secured without skill.

Further, if there is a discrepancy between the installation positions of the module and those of the vehicle body, the supporting pin 68 may be slightly moved in an inserting direction to the hole 86 without shifting the reference position thereof when the fastening portions (installation holes 28 and 30) of the pivot holders 12 and 14 are fastened and fixed to the vehicle body. Therefore, the fixing operation including the slight adjustment of the fixing positions may be easily conducted in shorter time with the least number of fastening bolts(only two bolts inserted into the installation holes 28 and 30).

Further, as mentioned above, the installation hole 28 at the driver seat side is formed as the long narrow circular cross 10 sectional hole so that the pivot holder 12 may slide only in one direction with respect to the fastening bolt before being fixed to the vehicle body. On the other hand, the installation hole 30 at the passenger seat side is formed as the so called loose hole whose diameter is larger than that of the fastening 15 bolt so that the pivot holder 14 may move in all directions with respect to the fastening bolt. The adjustment for the fixing position only in one direction at the driver seat side is more limited than that in all directions at the passenger seat side.

It is preferable to set the wiping range of the wiper arm and blade at the driver seat side with a priority to prevent an overrunning and an interference of the wiper arm and not to disturb the driving operation by the driver. Therefore, the installation hole 28 at the driver seat side allows the fixing position of the module to place only near to the predetermined reference position of the vehicle body. On the other hand, the installation hole 30 at the passenger seat side allows the fixing position more widely to the extent that the adjustment not permitted at the installation hole 28 may be also absorbed.

Further, the installation legs 62 of the wiper motor 58 may be designed to slightly move on the flat installation seat 50 to shift the mutual position of the installation holes 63 and 52. In this case, if the installation holes 28 and 30 can not make the sufficient adjustment of the fixing position by some reasons, the fixing position of the wiper motor 58 to the hollow frame 42 may be adjusted. This will increase the flexibility for adjusting the fixing position of the module to the vehicle body.

Figure 7:
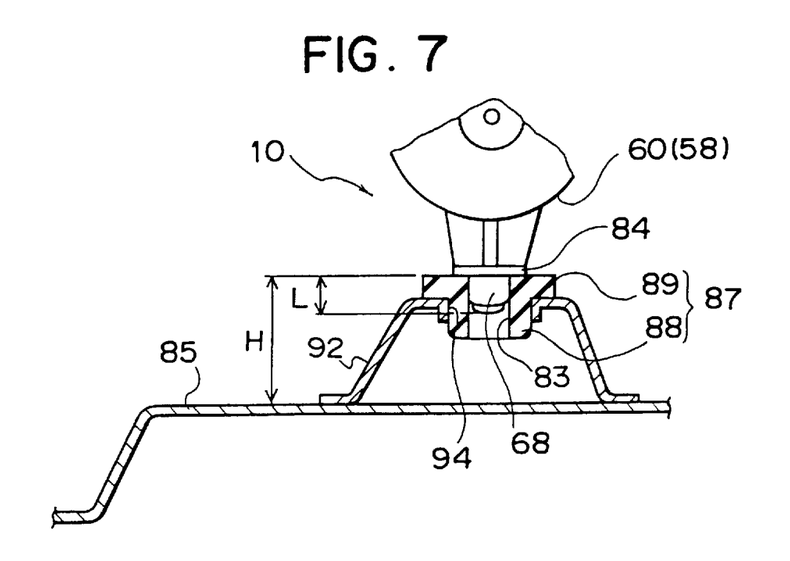
FIG. 7 is a partly cross sectional plane view showing the supporting pin inserted to a modified vehicle body.

FIG. 7 shows a partly cross sectional plane view showing the supporting pin 68 inserted into a modified vehicle body. The same parts and components as shown in FIG. 4 have the same reference numbers and the explanation thereof is omitted. According to the modified vehicle body, a bracket 92 is fixed to the panel 85 of the vehicle body. The bracket 92 is provided with a holding hole 94, in place of the holding hole 86 in FIG. 4, into which the supporting pin 68 is inserted through the bush 87.

It goes without saying that the length L from the leading end of the supporting pin 68 to the stopper 84 is shorter than the length H from the panel 85 to the surface of the flange portion 89 of the bush 87 so that the supporting pin 68 may be inserted into the hole 94 until the stopper 84 is in contact with the surface of the flange portion 89. Therefore, even if the bracket 92 or some other parts is fixed to the panel 85 for fixing the wiper device, the bracket 92 or some other parts shall be deemed as a part of vehicle body for the present invention.

According to the embodiment mentioned above, though the shape of the supporting pin 68 is described as a column (circular cross section), the cross section of the supporting pin 68 may be shaped as a long narrow circle and the holding hole 86 or 94 (bush 87) may be shaped corresponding to the shape of the supporting pin 68, as shown in FIG. 8. In this case, the contacting area where the supporting pin 68 and the holding hole 86 or 94 (bush 87) are in contact with each other becomes larger. Therefore, pressure per area against the supporting pin 68 due to the driving reaction force by the wiper motor 58 may be eased. As mentioned above, the enlargement of the contacting area at the side where the driving reaction force is more heavily affected may ensure a sufficient strength of the supporting pin 68.

What is claimed is:

1. Wiper device having a wiper motor and link module held by and fixed to a vehicle body, the wiper motor and link module comprising:

a frame;

a wiper motor for generating a driving force having a fixing base fixed to the frame, the wiper motor having a supporting pin on a side opposite to the fixing base, the supporting pin being inserted into and held by the vehicle body;

a pair of pivot shafts;

a pair of pivot holders for rotatably supporting each of the pivot shafts respectively fixed at both ends of the frame, each of the pivot holders having a fastening portion fastened and fixed to the vehicle body after the supporting pin is inserted thereto, so as to form a triangle territorial region defined by positions of the supporting pin inserted into the vehicle body and the respective fastening portions of the pivot holders fixed to the vehicle body; and a link mechanism connecting the wiper motor and each of the pivot shafts for transmitting the driving force of the wiper motor to each of the pivot shafts;

wherein a force due to gravity acting on a gravity center of the wiper motor passes through the triangle territorial region.

2. Wiper device according to claim 1, wherein the wiper motor has an output shaft connected with the link mechanism and the supporting pin protrudes from the wiper motor perpendicularly to an axis of the output shaft of the wiper motor and in a direction away from a line connecting the respective fastening portions of the pivot holders.

3. Wiper device according to claim 1, wherein the supporting pin is provided with a stopper for restricting an axial inserting distance when the supporting pin is inserted into and held by the vehicle body.

4. Wiper device according to claim. 3, wherein the stopper is a shoulder formed in the supporting pin and a base portion of the shoulder is provided with a smoothly curved corner rounded surface.

5. Wiper device according to claim 1, wherein the frame is a pipe having partly a flat outside surface where the wiper motor is placed.

6. Wiper device according to claim 1, wherein the wiper motor has an installation leg and is fixed directly to the frame by the installation leg at least at two points parallel to the frame.

7. Installation structure of mounting a wiper device on a vehicle body, wherein the vehicle body is provided with a hole, the wiper device having a wiper motor and link module to be held by and fixed to a vehicle body, the wiper motor and link module comprising:

a frame;

a wiper motor for generating a driving force having a fixing base fixed to the frame and being integrally-provided on a side opposite to the fixing base with a supporting pin to be inserted into and held by the vehicle;

a pair of pivot shafts;

a pair of pivot holders for rotatably supporting each of the pivot shafts respectively fixed at both ends of the frame, each of the pivot holders having a fastening portion to be fastened and fixed to the vehicle body after the supporting pin is inserted thereto; and a link mechanism connecting the wiper motor and each of the pivot shafts for transmitting the driving force of the wiper motor to each of the pivot shafts;

wherein a force due to gravity acting on a gravity center of the wiper motor passes through a triangle territorial region surrounded by positions of the supporting pin and the respective fastening portions of the pivot holders, when the wiper motor and the link module are fixed to the vehicle body;

wherein the installation structure comprises a bush made of elastic material having a cylindrical portion and a flange portion provided at an end of the cylindrical portion, an outer circumference surface of the cylindrical portion being fitted into the hole and the flange portion being in contact with a periphery around the hole;

wherein the supporting pin is inserted through an inner circumference of the cylindrical portion so that the wiper motor and the link module are held via the bush by the vehicle body.

8. Installation structure according to claim 7, wherein the bush is made of rubber.

9. Installation structure according to claim 7, wherein the supporting pin has a long narrow circular cross section and the hole is shaped corresponding to the shape of the supporting pin.

10. Wiper motor and link module to be fixed to an installation body having a hole, the wiper motor and link module comprising:

a frame;

a wiper motor having an output shaft, an installation leg fixed directly to the frame at a first side thereof and a supporting pin protruding in a direction away from the frame at a second side opposite to the first side, the supporting pin to be inserted into and held by the hole, the supporting pin protruding from the wiper motor perpendicularly to an axis of the output shaft of the wiper motor and in a direction away from a line connecting respective fastening portions of a pair of pivot holders;

a pair of pivot shafts;

a pair of pivot holders for rotatably supporting each of the pivot shafts respectively fixed at both ends of the frame, each of the pivot holders having a fastening portion to be fastened and fixed to the installation body after the supporting pin is inserted thereto, so as to form a triangle territorial region defined by the supporting pin to be inserted into the hole and the respective fastening portions of the pivot holders to be fixed to the installation body; and a link mechanism connecting the output shaft of the wiper motor and each of the pivot shafts for transmitting the driving force of the wiper motor to each of the pivot shafts;

wherein a force due to gravity acting on a gravity center of the wiper motor passes through the triangle territorial region.

11. Wiper motor and link module according to claim 10, wherein the frame is a pipe having partly a flat outside surface where the installation leg of the wiper motor is placed.

12. Wiper motor and link module according to claim 11, wherein the wiper motor is fixed to the frame by the installation leg at least at two points parallel to the frame.

13. Wiper motor and link module according to claim 10, wherein the supporting pin is provided with a stopper for restricting an axial inserting distance when the supporting pin is inserted into and held by the installation body.

14. Installation structure for mounting a wiper motor and link module on an installation body having a hole, the wiper motor and link module comprising:

a frame;

a wiper motor having an output shaft, an installation leg fixed directly to the frame at a first side thereof and a supporting pin protruding in a direction away from the frame at a second side opposite to the first side, the supporting pin to be inserted into and held by the hole, the supporting pin protruding from the wiper motor perpendicularly to an axis of the output shaft of the wiper motor and in a direction away from a line connecting respective fastening portions of a pair of pivot holders;

a pair of pivot shafts;

a pair of pivot holders for rotatably supporting each of the pivot shafts respectively fixed at both ends of the frame, each of the pivot holders having a fastening portion to be fastened and fixed to the installation body after the supporting pin is inserted thereto, so as to form a triangle territorial region defined by the supporting pin to be inserted into the hole and the respective fastening portions of the pivot holders to be fixed to the installation body;

a link mechanism connecting the output shaft of the wiper motor and each of the pivot shafts for transmitting the driving force of the wiper motor to each of the pivot shafts;

wherein a force due to gravity acting on a gravity center of the wiper motor passes through the triangle territorial region; and wherein the installation structure comprises a bush made of elastic material having a cylindrical portion and a flange portion provided at an end of the cylindrical portion, an outer circumference surface of the cylindrical portion being fitted into the hole and the flange portion being in contact with a periphery around the hole, and, further, wherein the supporting pin is inserted through an inner circumference of the cylindrical portion so that the wiper motor and the link module are held via the bush by the installation body.

* * * * *